(12) United States Patent
Wood (10) Patent No.: US 7,575,411 B2
(45) Date of Patent: Aug. 18, 2009

(54) ENGINE INTAKE AIR COMPRESSOR HAVING MULTIPLE INLETS AND METHOD

(75) Inventor: Terry G. Wood, Countryside, IL (US)

(73) Assignee: International Engine Intellectual Property Company LLC, Warrenville, IL (US)

(*) Notice: Subject to any disclaimer, the term of this patent is extended or adjusted under 35 U.S.C. 154(b) by 411 days.

(21) Appl. No.: 11/438,551

(22) Filed: May 22, 2006

(65) Prior Publication Data

US 2007/0269308 A1    Nov. 22, 2007

(51) Int. Cl.
    F04D 29/42 (2006.01)
(52) U.S. Cl. .................. 415/58.4; 415/914; 416/228; 416/223 B; 416/223 A
(58) Field of Classification Search ............. 415/57.4, 415/57.1, 56.1, 56.5, 58.4, 9, 14, 11
See application file for complete search history.

(56) References Cited

U.S. PATENT DOCUMENTS

| | | | |
|---|---|---|---|
| 3,462,071 A * | 8/1969 | Garve ................... 415/116 |
| 4,696,165 A * | 9/1987 | Bucher .................. 60/609 |
| 4,743,161 A | 5/1988 | Fischer et al. |
| 4,781,530 A | 11/1988 | Lauterbach et al. |
| 4,930,978 A | 6/1990 | Khanna et al. |
| 5,025,629 A | 6/1991 | Woollenweber |
| 5,333,990 A * | 8/1994 | Foerster et al. ......... 415/58.4 |
| 6,196,789 B1 | 3/2001 | McEwen et al. |
| 6,540,480 B2 | 4/2003 | Nikpour |
| 6,648,594 B1 * | 11/2003 | Horner et al. ........... 415/144 |
| 2002/0012586 A1 | 1/2002 | Nikpour |
| 2005/0175465 A1 | 8/2005 | Nishiyama et al. |

FOREIGN PATENT DOCUMENTS

DE    4213047 A1 * 10/1993
GB    2166800 A  *  5/1986

* cited by examiner

*Primary Examiner*—Richard Edgar
(74) *Attorney, Agent, or Firm*—Jack D. Nimz; Jeffrey P. Calfa

(57) ABSTRACT

A compressor assembly (404) includes a compressor housing (412) having a main inlet bore (424) and a secondary inlet passage (422) that has an increasing flow cross-sectional area. The secondary inlet passage (422) is positioned in the compressor housing (412) and around the main inlet bore (424). A secondary inlet slot (426) and an outlet slot (420) fluidly connect the secondary inlet passage (422) with the main inlet bore (424). A compressor wheel (418) is in the compressor housing (412) and has a stepped portion (518) formed by at least one plurality of vanes (506). The stepped portion (518) is located adjacent to the outlet slot (420) of the housing (412).

30 Claims, 8 Drawing Sheets

SECTION A-A
FIG. 5

SECTION B-B

ENGINE INTAKE AIR COMPRESSOR HAVING MULTIPLE INLETS AND METHOD

FIELD OF THE INVENTION

This invention relates to intake air compressors, such as turbochargers or superchargers, for internal combustion engines.

BACKGROUND OF THE INVENTION

Engines having compressors for intake air, such as turbochargers or superchargers are well known. Compressor efficiency over a large range of operation is desired for economical and efficient operation of the engine. All compressors are limited by a "surge" condition and a "choke" condition. Compressor surging occurs at high pressure ratios and low airflows for a given rotational speed of a compressor wheel, and is shown as a surge line on a compressor map. When surging occurs, the compressor begins operating in a region of diminishing returns and more power input is required to continue operating the compressor while the compressor progressively provides less air at a lower pressure. Compressor choking occurs at higher air flow conditions for a given rotational speed. Compressor choking represents the limit of the compressor air flow capability, and is shown as a choke line on a compressor map. The region between the surge line and the choke line defines the useable range of operation for the compressor.

There have been many attempts to increase the useable range of operation for compressors and thereby allow a single compressor to operate efficiently over a wider range of airflows and speeds. One prevalent solution is the addition of a recirculation chamber at the inlet of the compressor, along with inlet and outlet slots at the inlet of the compressor. This solution has been somewhat successful in extending the service range of the compressor before surging occurs.

One example of a known configuration for a recirculation system in a compressor can be found in the description and accompanying figures of U.S. Pat. No. 4,743,161 by Fisher et al., the contents of which are incorporated herein in their entirety by reference. In Fisher's disclosure, at least one aperture or a series of radial holes are formed in the surface of the inner wall of the compressor housing adjacent to the compressor wheel and are disposed in fluid communication with an annular passage around the inlet bore. Air flowing radially outward from the compressor wheel during operation enters the annular passage and does not interfere with incoming air, thus allowing the compressor to handle higher air flows without surging.

One main disadvantage of the Fisher configuration for a recirculation system is that the improvements to the flow capability of the compressor are limited and are inadequate in meeting the requirements of modern engine systems. Typical modern engine systems resort to use of multiple turbochargers in series or parallel configurations and/or auxiliary compressors to achieve an acceptable performance and efficiency over larger operating ranges.

Accordingly, there is a need for an improvement to existing compressor designs that allows for an extended range of operation of the compressor and the engine.

SUMMARY OF THE INVENTION

An engine intake air compressor in accordance with the invention includes a compressor housing having a main inlet annular cavity, including an inducer bore and a secondary inlet passage disposed about the outer periphery of the inducer bore and extending to an inducer slot intersecting the inducer bore downstream of the inducer bore entrance to form an enlarged or augmented inducer bore diameter downstream of the inducer bore entrance. In a preferred embodiment, the secondary inlet passage may have an aerodynamic profile and be positioned in the compressor housing around the main inlet bore and extend from the inducer slot to a ring slot fluidly connecting the recirculation secondary inlet passage with the entrance to the inducer bore. Alternatively, the inducer slot may be connected to an exterior inlet source. In accordance with the invention, a compressor wheel is partially disposed in the inducer bore and has a stepped portion formed in at least one plurality of vanes on the compressor wheel to form an enlarged diameter inducer portion located adjacent to the inducer slot of the secondary inlet passage. In an alternative embodiment, multiple inducer slots may be formed which respectively interact with multiple enlarged inducer diameter portions of the compressor wheel to even further increase the effective flow area and flow capacity of the compressor, thereby improving the operating range of the compressor between a surge line and a choke line on a compressor map.

A method for manufacturing an engine intake air compressor having an improved flow range capability includes the step of casting a compressor housing having a cast-in secondary inlet passage, preferably of expanding aerodynamic profile. An inducer bore and an inducer slot interconnecting the inducer bore and the secondary inlet passage are machined on the housing. A compressor wheel having at least one plurality of vanes is cast and is machined with a stepped portion on at least one plurality of vanes providing an enlarged diameter inducer portion of the compressor wheel. The compressor wheel is attached to a shaft and the compressor housing is assembled around the compressor wheel. The stepped portion of the vanes is placed adjacent to the inducer slot when assembly of the compressor housing around the compressor wheel is complete.

A method of improving performance of an engine intake air compressor includes the step of connecting a compressor wheel having a plurality of vanes, each vane having an outer edge, to a shaft mounted for rotation in a bore within a housing having a secondary inlet passage including a first inducer opening from the bore to the secondary inlet passage. Under near choke conditions, the flow in the secondary inlet passage is drawn from the inducer opening into an enlarged diameter inducer portion formed on the compressor wheel by a stepped portion on the vanes and thereby providing an enlarged effective flow diameter and greater air flow capacity of the compressor. In a preferred method, the secondary inlet may connect to the inducer bore upstream of the entrance thereto. Near surge conditions, compressor performance can advantageously be improved by admitting a portion of the air flow from the turbulence field generated by the outer edges of the vanes into the secondary inlet passage through the inducer opening for mixing with the intake air to the compressor upstream of the entrance point to the inducer bore because the flow of air in the secondary inlet passage will be in the reverse direction under these conditions.

DESCRIPTION OF A PREFERRED EMBODIMENT

Figure 1:
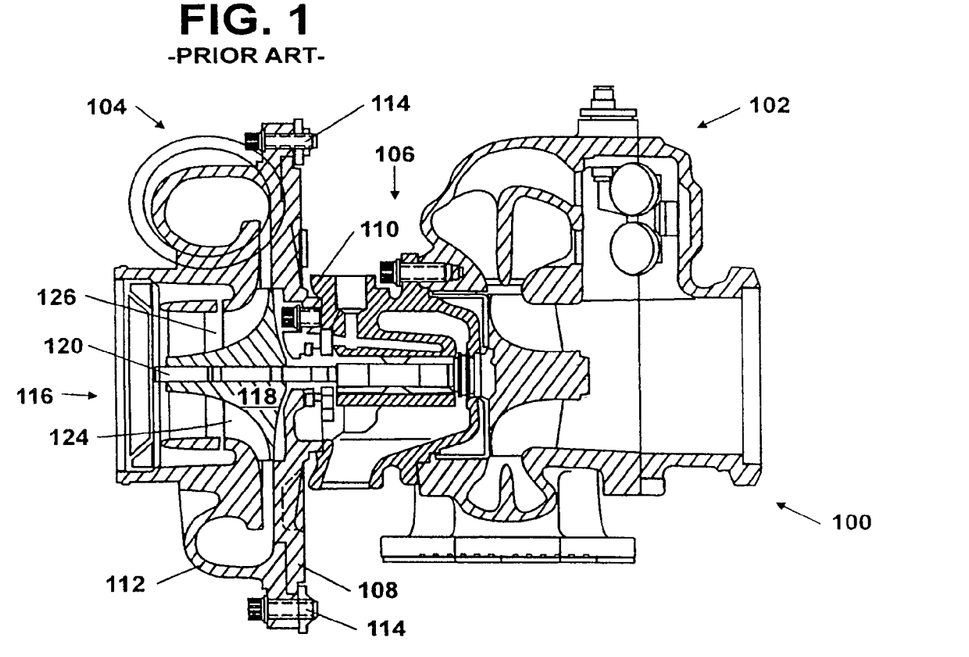
FIG. 1 is a cross-section view of a prior art turbocharger having a compressor having a recirculation passage.

The following describes an apparatus for and method of extending the flow range of a compressor for use with an internal combustion engine. Although the invention is applicable to a mechanically-driven supercharger, this description is in the context of an exhaust-gas-driven turbocharger. As shown in FIG. 1, the turbocharger 100 includes a turbine assembly 102 connected to a compressor assembly 104 through a center-housing assembly 106. The compressor assembly 104 includes a back-plate 108 that is connected to a casting 110 of the center-housing 106. The back-plate 108 is connected to a compressor housing 112 and secured with a plurality of bolts 114. Other compressors may use v-band clamps, bone-clamps, or other connection configurations. The compressor housing for a typical compressor may be made of aluminum, and may be formed by a die-casting operation, although other materials and manufacturing methods can and have been used in the past.

Figures 2, 3:
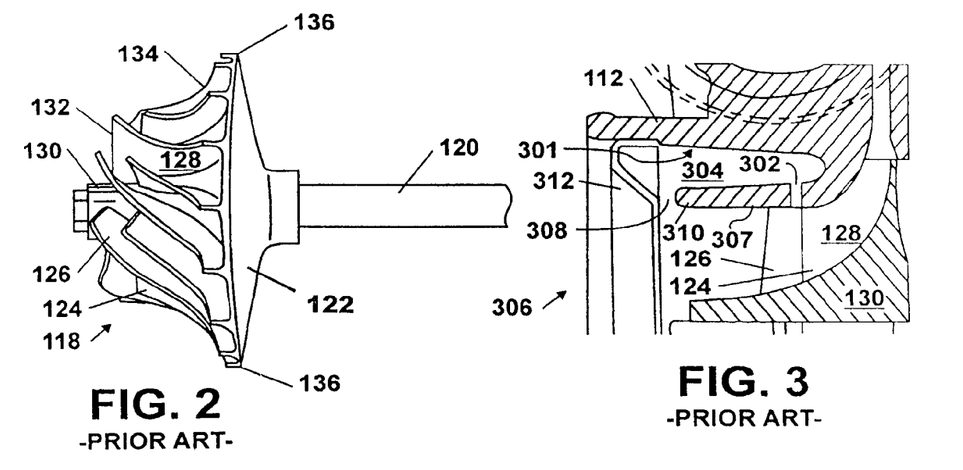
FIG. 2 is a radial view of a compressor wheel of the turbocharger of FIG. 1.
FIG. 3 is an enlarged cross-section of the turbocharger of FIG. 1.

The compressor assembly 104 has an inlet 116 and an outlet (not shown). A compressor wheel 118 is enclosed between the housing 112 and plate 108. The wheel is mounted onto a shaft 120 that is free to rotate within the housing 112. The compressor wheel 118 attached to the shaft 120, as shown in FIG. 2, and includes a base 122 having a first plurality of short vanes 124 and a second plurality of long vanes 126. Each of the vanes 124 and 126 includes a curved vane body section 128 that is connected to a central hub 130 on one side, to the base 122 on another side, has a leading edge 132, a curved side edge 134, and a discharge edge 136.

As shown in FIG. 3, the annular inlet cavity 301 of housing 112 in the area of the compressor wheel 118 has certain features to enhance performance of the compressor 104. A recirculation passage inlet slot 302 fluidly connects an annular recirculation chamber 304 with an air intake 306 and an inducer bore 307. The recirculation chamber 304 is fluidly connected to the air intake 306 through a recirculation outlet slot 308 that is formed between an inlet wall 310 and an inlet ring 312. The recirculation chamber 304 is separated from the air intake 306 by the annular inlet wall 310 defining the periphery of the inducer bore 307. The recirculation chamber 304 is the annular volume defined between the housing 112, the wall 310, and the inlet ring 312.

During operation of the compressor 104, the compressor wheel 118 rotates about a central axis of the shaft 120 within the housing 112. Air enters the compressor assembly 104 through the air intake 306, from where it passes the ring 312 and into the inducer bore 307. Under certain conditions of air pressure, temperature, mass flow, and rotational speed of the wheel 118, turbulence coming off each of the leading edges of the vanes 124 and 126 may interfere with air flow into the inducer bore 307, causing the compressor 104 to "surge." In a surging condition, airflow into the compressor wheel 118 is reduced, and, while work input to rotate the compressor wheel 118 increases, the efficiency of the compressor 104 is lowered. A surging condition is undesirable to the operation of a compressor, and the extension of the operating range of a compressor before surging occurs is advantageous. An addition of the recirculation chamber 304, along with the inlet and outlet slots 302 and 308 is partly successful in extending the operating range of the compressor 100 before surging occurs.

Figures 4, 5:
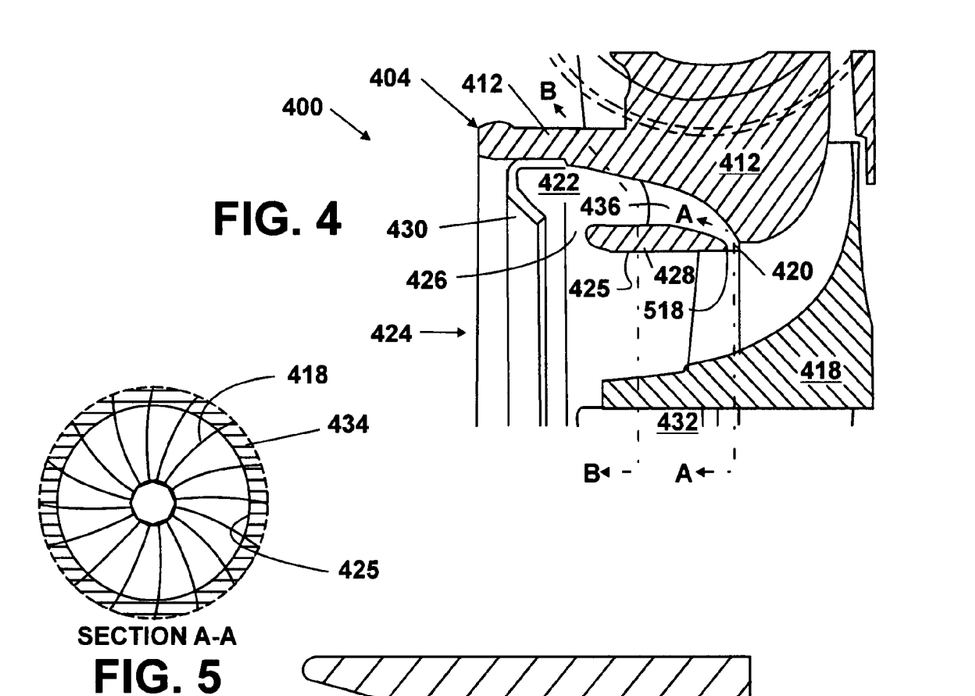
FIG. 4 is a cross-section of a compressor wheel positioned in a compressor similar to FIG. 3 and having a recirculation passage in accordance with the invention.
FIG. 5 is a cross-section view of an inlet region of the compressor of FIG. 4 showing an augmented inducer diameter in accordance with the invention.

An improved compressor assembly 400 in accordance with the invention is shown in FIG. 4. A compressor 404 has a housing 412 enclosing a compressor wheel 418. The housing 412 in the area of the wheel 418 has features that enhance performance of the compressor 404. A secondary inducer slot 420 fluidly connects a chamber 422 with an inducer bore 425. A secondary entry or ring slot 426 is formed between an inlet wall 428 and an inlet ring 430, and fluidly connects the chamber 422 with the air intake 424. The chamber 422 is separated from the main air intake 424 by the inlet wall 428. The chamber 422 is the annular volume between the housing 412, the inlet wall 428 and the inlet ring 430. The inlet wall 428 advantageously has an aerodynamic or airfoil cross-sectional shape within the recirculation chamber 422.

The chamber 422 may advantageously have an increasing cross-sectional flow area expanding in a generally axial direction from the inducer slot 420 toward the ring slot 426, to facilitate the flow of recirculated air from the inducer slot 420 to the ring slot 426 when the compressor 404 operates in a region of the usable portion of the compressor map close to a surge condition. During operation of the compressor 404, the compressor wheel 418 rotates about a central axis of a shaft 432 within the housing 412. Air enters the compressor assembly 404 through the air intake 424 and enters the inducer bore 425.

Figure 4A:
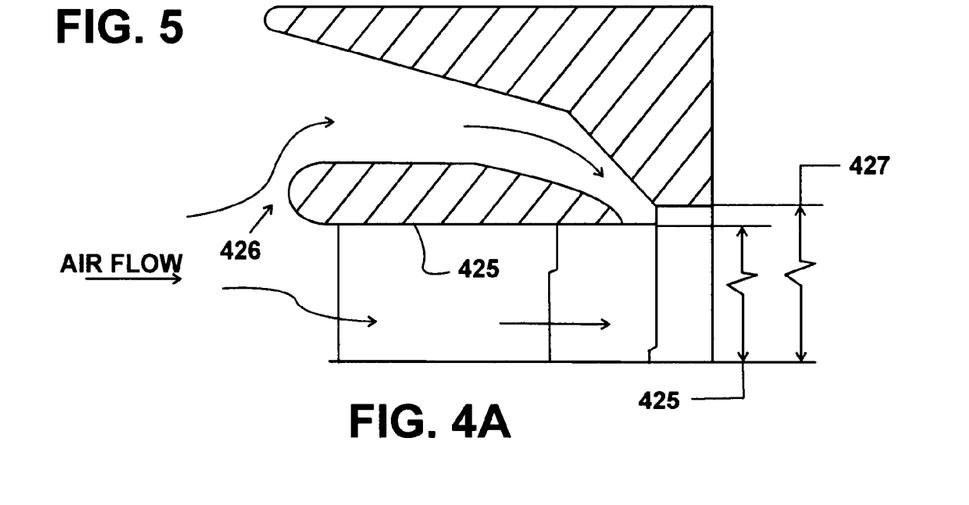
FIG. 4A is a detail view of the cross-section of the compressor of FIG. 4.

When the compressor 404 operates in a region of the usable portion of the compressor map close to a choke condition, the air flow within the chamber 422 reverses so that air enters the chamber 422 through the slot 426 and is drawn through the inducer slot 420 into the compressor wheel 418. In this regard, the aerodynamic or airfoil profile of the inlet wall 428 and the housing 412 within the chamber 422 may advantageously be arranged to create a Coanda effect to minimize frictional effects on additional air that is entering the compressor through the inducer slot 420. The inducer slot 420 functions as an enlargement or augmentation of the inducer bore 425 when the compressor 404 operates close to a choke condition, by allowing an additional mass flow of air to access the compressor wheel 418 as presented in FIG. 5 showing a reduced-scale cross-sectional view along an axis A-A shown in FIG. 4. A secondary or augmented inducer bore or diameter region 434 is thus created by the inducer slot 420 around the inducer bore 425. The augmented inducer diameter region 434 cooperating with a larger effective diameter of the inducer portion 427 of the compressor wheel 418, as shown in FIG. 4A, increases the effective flow area and allows additional flow of air to enter the compressor wheel 418 when the compressor 404 operates near a choke condition. Referring to FIG. 4A, the solid-line arrows represent a flow of air entering the compressor 400 through the main inducer bore 425 and through the secondary entry slot 426.

When the compressor 404 operates close to a surge condition, the secondary outlet slot 420 combined with the expanding volume of the chamber 422 may advantageously improve the air flow and increase the capacity during operation of the compressor 404 in that region and may increase the speed of the air passing though the chamber thereby reducing the air pressure to enable more air to be pulled in from the inducer bore 425. Moreover, the aerodynamic shape of the wall 428 may be further augmented by the ring 430 which may advantageously protrude less into the bore 424 than the ring 312 protrudes into the bore 306. The ring 430 may allow air from the volume 422 to enter the bore 424 through a large annular opening, the ring slot 426.

Figures 6, 7A, 7B:
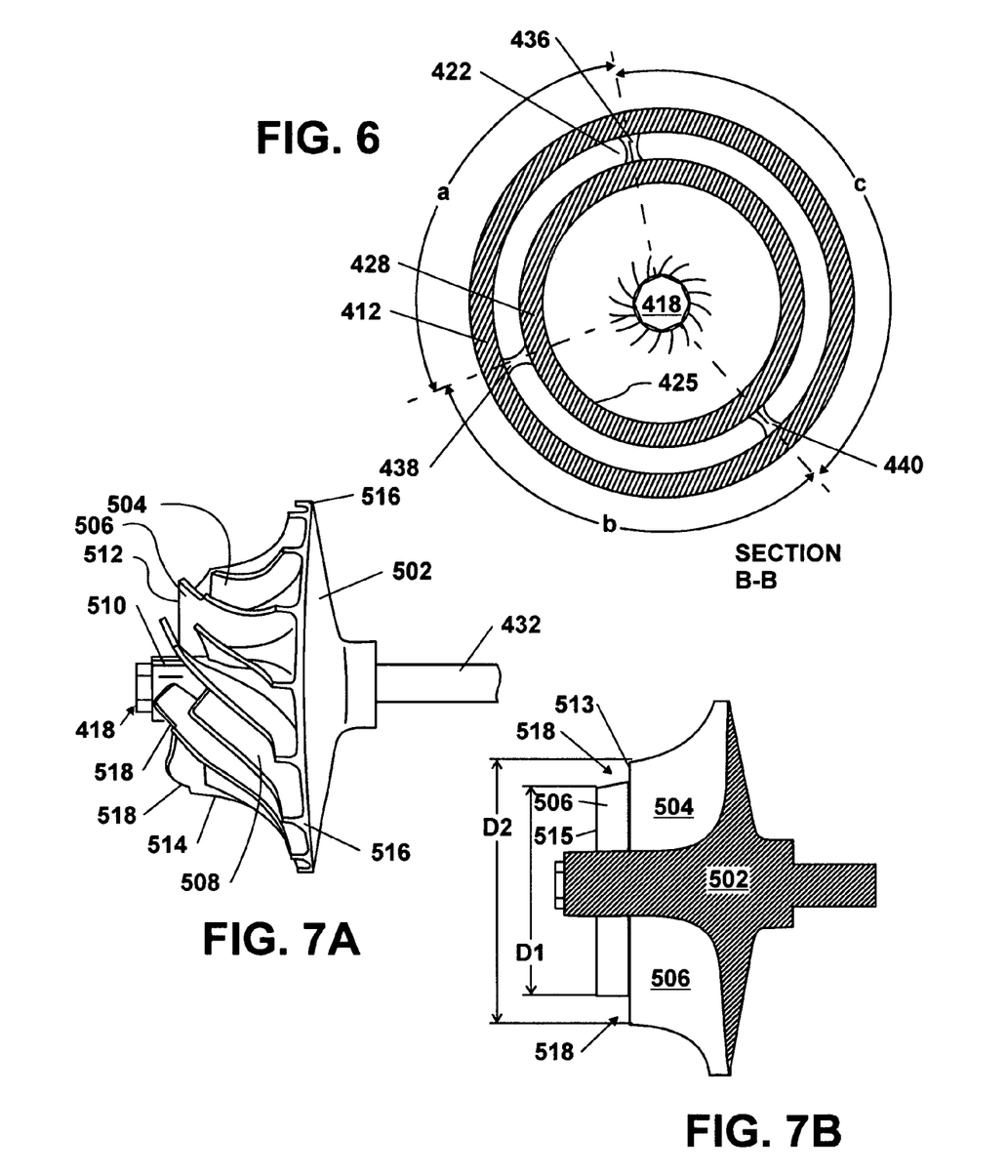
FIG. 6 is a cross-section of an inlet region of the compressor of FIG. 4 showing a configuration for support ribs for the inlet wall in accordance with the invention.
FIG. 7A is a view of a compressor wheel similar to FIG. 2 and having a stepped portion in accordance with the invention.
FIG. 7B is a cross-section of the compressor wheel of FIG. 7A.

A cross section of the compressor housing 412 along a plane B-B is shown in FIG. 6. The inducer bore 425 is surrounded by the inlet wall 428, shown in cross section. Around the inlet wall 428 is the chamber 422, and around the chamber 422 is the housing 412. A first rib 436 connects the inlet wall 428 with the housing 412. The rib 436 may be a cast feature that is created during the same casting operation that forms the housing 412. The rib 436 may be required to provide structural support to the inlet wall 428. A second rib 438 may be used along with a third rib 440 to provide additional support to the inlet wall 428. More ribs may be used if required. Each of the ribs 436, 438, and 440 may be placed in radial positions along a periphery of the inducer bore 425. An angle a may separate the ribs 436 and 438, a second angle b may separate the ribs 438 and 440, and a third angle c may separate the ribs 440 and 436. The angles a, b, and c, may advantageously be different than 120 degrees and also different from one another so as to not create resonance conditions that may fall within an operational range of the compressor 404. For instance, the angle a may be about 100 degrees, the angle b may be about 110 degrees, and the angle c may be about 150 degrees, but other measurements may be used.

A detail view of the compressor wheel 418 is shown in FIG. 7A in isometric view, and in FIG. 7B in cross section along the shaft 432. The compressor wheel 418 includes a base 502 having a first plurality of short vanes 504 and a second plurality of long vanes 506. Typically, each vane of the first plurality of vanes 504 is identical to each other and each vane of the second plurality of vanes 506 is identical to each other. Each of the vanes 504 and 506 include a curved vane body section 508 that is connected to a central hub 510 on one side, to the base 502 on another side, has a leading edge 512, a curved side edge 514, and a discharge edge 516. In one embodiment shown in the alternative with dashed line in the lower portion of FIG. 7B, each of the long vanes 506 may advantageously have a stepped portion 518 wherein the vane diameter abruptly increases in a radial direction to form a larger effective inducer diameter 427, the intersection between the radial and axial edges being slightly rounded to prevent stress concentrations. In a preferred embodiment, shown in the upper part of FIG. 7B, the stepped portion 518 may be formed between each of vane pluralities 504 and 506. In this case, the vanes 506 may have an outer diameter or periphery D1 in the area of the stepped portion 518 that is smaller than an outer diameter or periphery D2 of the vanes 504, but have a leading edge 513 that extends further away from the hub 502 than a leading edge 515 of the vanes 506. A location of the outer diameter D2 on the compressor wheel 418 is advantageously away from a location of the leading edge 512 of the vanes 506, and closer to the base 502. The stepped portion 518 is arranged to be adjacent to the inducer slot 420 when the wheel 418 is disposed in the housing 412. It is advantageous to the operation of the compressor 404 to combine the disposition of the inducer slot 420 adjacent to the aerodynamic wall 428 with the stepped portion 518 in the wheel 502, and more importantly, the disposition of the stepped portion 518 into the augmented inducer diameter 434 to increase the effective flow area of the inducer section of the compressor 404.

Figure 8:
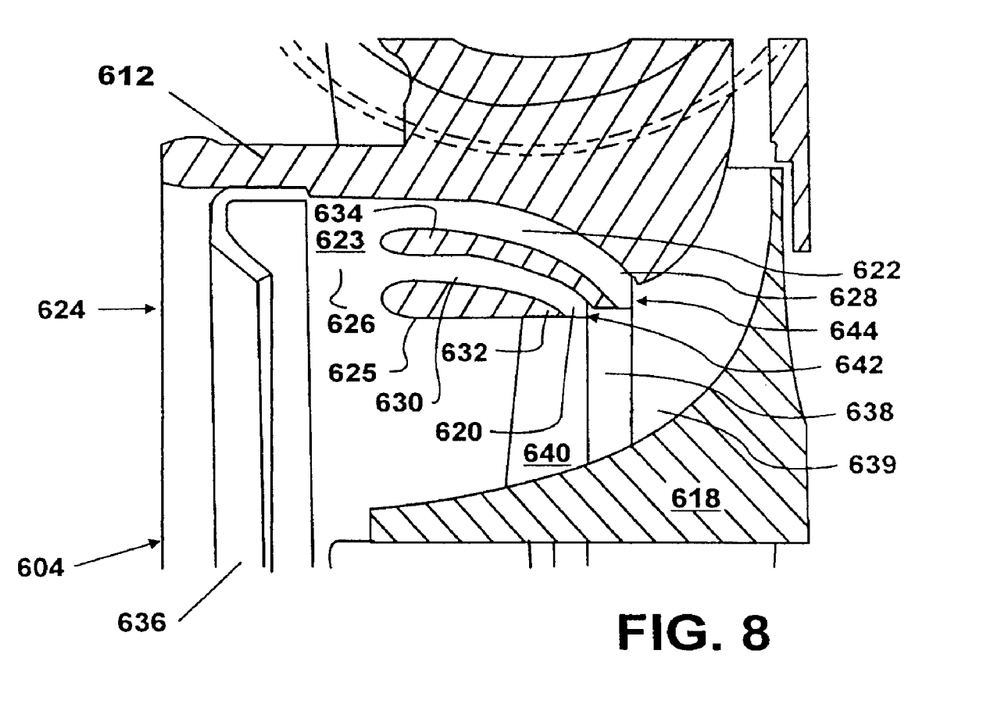
FIG. 8 is a cross-section of a compressor wheel positioned in a compressor similar to FIG. 3 and having two recirculation passages in accordance with a second embodiment of the invention.

An alternate embodiment of a compressor 604 is shown in FIG. 8. The compressor 604 has a housing 612 enclosing a compressor wheel 618. The housing 612 in the area of the wheel 618 has features that enhance performance of the compressor 604. A first inducer slot 620 fluidly connects a first passage 622 with a main chamber 623 and functions as an enlargement or augmentation of the inducer bore 625 when the compressor 604 operates close to a choke condition, by allowing an additional mass flow of air to access the compressor wheel 618. A ring slot 626 fluidly connects the chamber 623 with an air inlet 624. A second inducer slot 628 fluidly connects a second passage 630 with the main chamber 623 and functions as a still further enlargement or augmentation of the inducer bore 625 when the compressor 604 operates close to a choke condition, by allowing an additional mass flow of air to access the compressor wheel 618. The second passage 630 is separated from the main inducer bore 625 by an inner wall 632. The first passage 622 is separated from the second passage by an outer wall 634. A portion of the housing 612 forms an outer boundary for the first passage 622. Each of the first and second passages 622 and 630 may have a cross sectional flow area that is no less than the cross sectional flow area of either of the inducer slots 620 and 628. The cross-sectional flow area of each of the passages 622 and 630 decreases in an axial and/or radial direction toward the respective inducer slot.

The augmented inducer diameters formed respectively by the first inducer slot 620 and second inducer slot 628 cooperating with the respectively larger effective diameters 638 and 640 of an inducer portion 645 of the compressor wheel 618 further increases the effective flow area of the compressor and allows additional flow of air to enter the compressor wheel 618 respectively from the slot 620 primarily in the axial direction into the radial portion 641 of the augmented diameter portion 642 formed in the stepped portion 638 and from the slot 628 primarily in the axial direction into the radial portion 643 of the augmented diameter portion 644 formed in the stepped portion 639 when the compressor 604 operates near a choke condition.

The compressor wheel 618 rotates within the housing 612 when the compressor 604 operates. Air enters the compressor assembly 604 through the air inlet 624. Both the inner wall 632 and the outer wall 634 advantageously have an aerodynamic or airfoil cross-sectional shape to advantageously reduce the air pressure, reduce the frictional losses, and increase the speed of air passing though the first passage 622 and the second passage 630 during operation of the compressor 604, thereby pulling more air or another fluid into the chamber 623 and increasing the flow capacity of the compressor. Moreover, the aerodynamic profile of the inner wall 632 and the outer wall 634 may be further augmented by a ring 636 which may advantageously protrude less into the bore 624 than the ring 312 protrudes into the bore 306 and create a reduced diameter low pressure region to aid in the reintroduction of recirculated air into the main air flow when the compressor is operating in the region near the surge line on the compressor map.

Figure 8A:
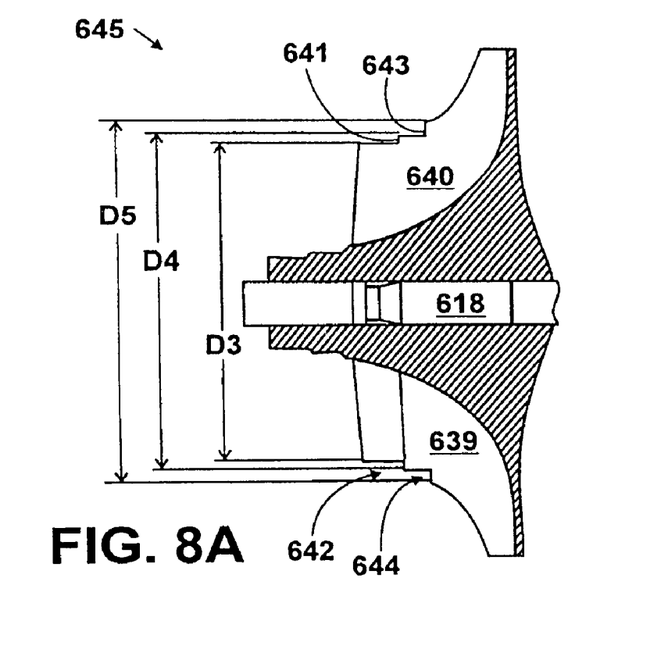
FIG. 8A is a cross-section of the compressor wheel partially shown in FIG. 8

The compressor wheel 618, shown in FIG. 8A in partial cross section, may include a first plurality of short vanes 638 and a second plurality of long vanes 640. A third plurality of shorter vanes 639 may be located behind the others. Each of the long vanes 640 may advantageously form a first stepped portion 642 wherein a vane diameter profile, D3, abruptly increases in a radial direction to form a larger effective inducer diameter, D4, and a second stepped portion 644 wherein the vane diameter profile D4 abruptly increases still further in a radial direction to form yet a larger effective inducer diameter, D5, as shown in FIG. 8A. The first stepped portion 642 may be arranged to be adjacent to the first slot 620, and the second stepped portion 644 may be arranged to be adjacent to the second slot 628, when the wheel 618 is in the housing 612. Each of the stepped portions 642 and 644 may be a physical stepped portion from the vanes 640 or may alternatively be a difference in profile between the vanes 638 and 640, or another appropriate combination. A location of the stepped portion 642 may be downstream of a location of the leading edges of the long vanes 640, and a location of the second stepped portion 644 may be at a location downstream from the first stepped portion 642, the downstream direction defined as a direction of air entering the compressor 604 through the bore 625 during operation of the compressor 604.

Other alternative configurations may involve compressor wheels having either one plurality of vanes, in which case one or more stepped portions may formed into the vanes. Alternatively, other compressor wheels may have two, three, or more pluralities of vanes. In such a case, stepped portions may be formed either into a plurality of vanes, between vane profiles of the different pluralities, or any combination of the above. Typical compressor wheels and housings may be made of metal. Some applications may require use of titanium as the metal making up the compressor wheel. Because of the relative difficulty in cutting compressor wheel vanes made of titanium, the stepped portions or recesses may be cast or otherwise formed into the compressor vane wheels during manufacturing, and may only be finished by a fine machining operation before they are installed into a compressor housing.

Figure 9:
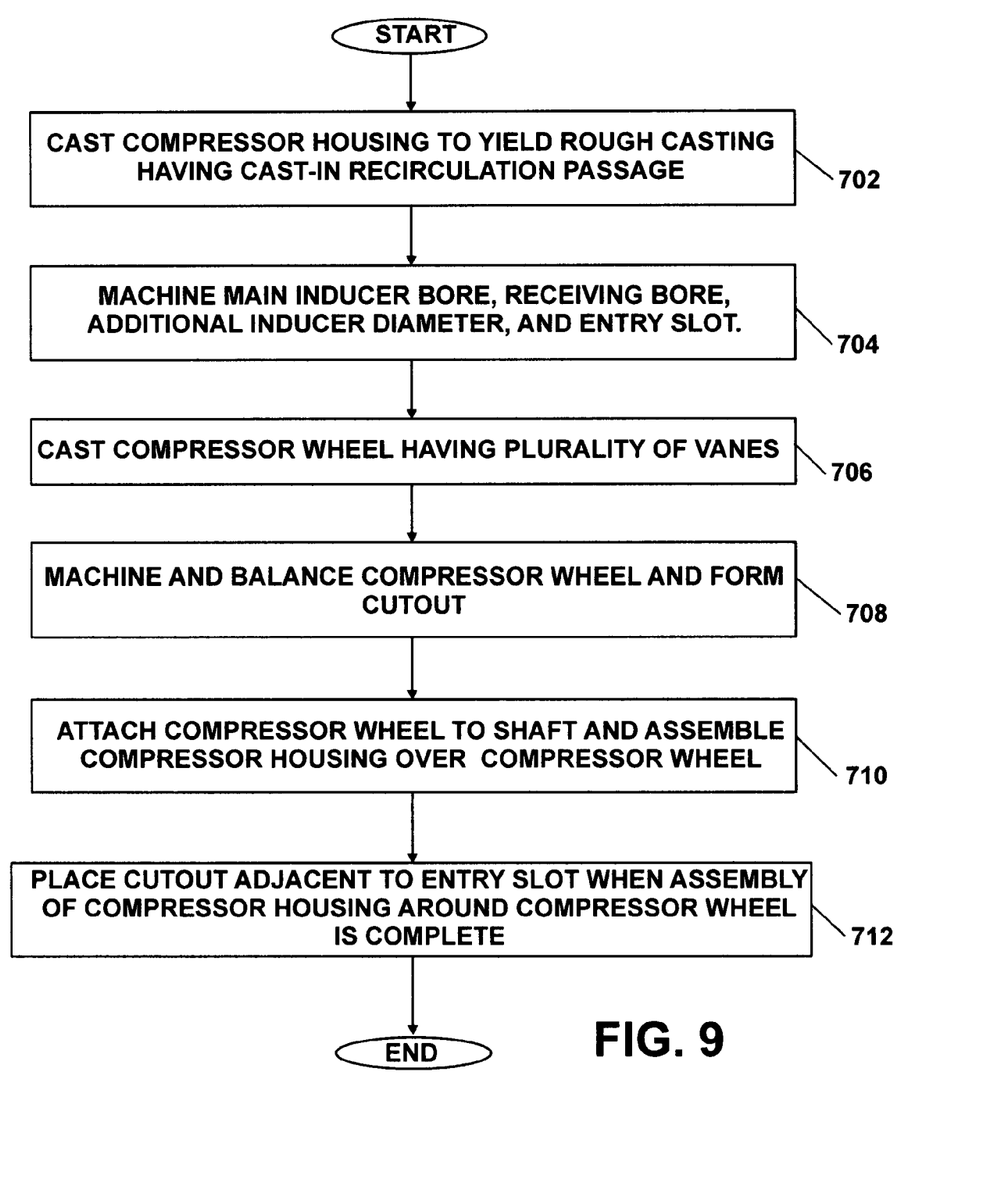
FIG. 9 is a flowchart for a method of manufacturing a compressor having an improved flow range capability in accordance with the invention.

A flowchart for a method of manufacturing a compressor having an improved flow range capability is shown in FIG. 9. A compressor housing may be cast out of metal yielding a rough casting at step 702. The rough casting may have casting datums, or, features that enable proper placement of the rough casting in an apparatus arranged and constructed to machine the rough casting. The housing is machined in step 704 to include, among other features, a main inducer bore for air inlet, a receiving bore for a ring, an additional inducer diameter, and an entry slot from the inducer bore to an already cast-in recirculation passage. A compressor wheel is cast in step 706 to include at least one plurality of vanes. The compressor wheel is machined and balanced at step 708 to include at least one stepped portion. The stepped portion may be machined into a plurality of vanes, as described above, or may advantageously be a difference in profile between two or more adjacent pluralities of vanes. The compressor wheel is attached to a shaft and assembled into the compressor housing at step 710. The stepped portion in the compressor wheel is positioned adjacent to the entry slot of the recirculation passage after assembly of the compressor housing around the compressor wheel at step 712.

Figure 10:
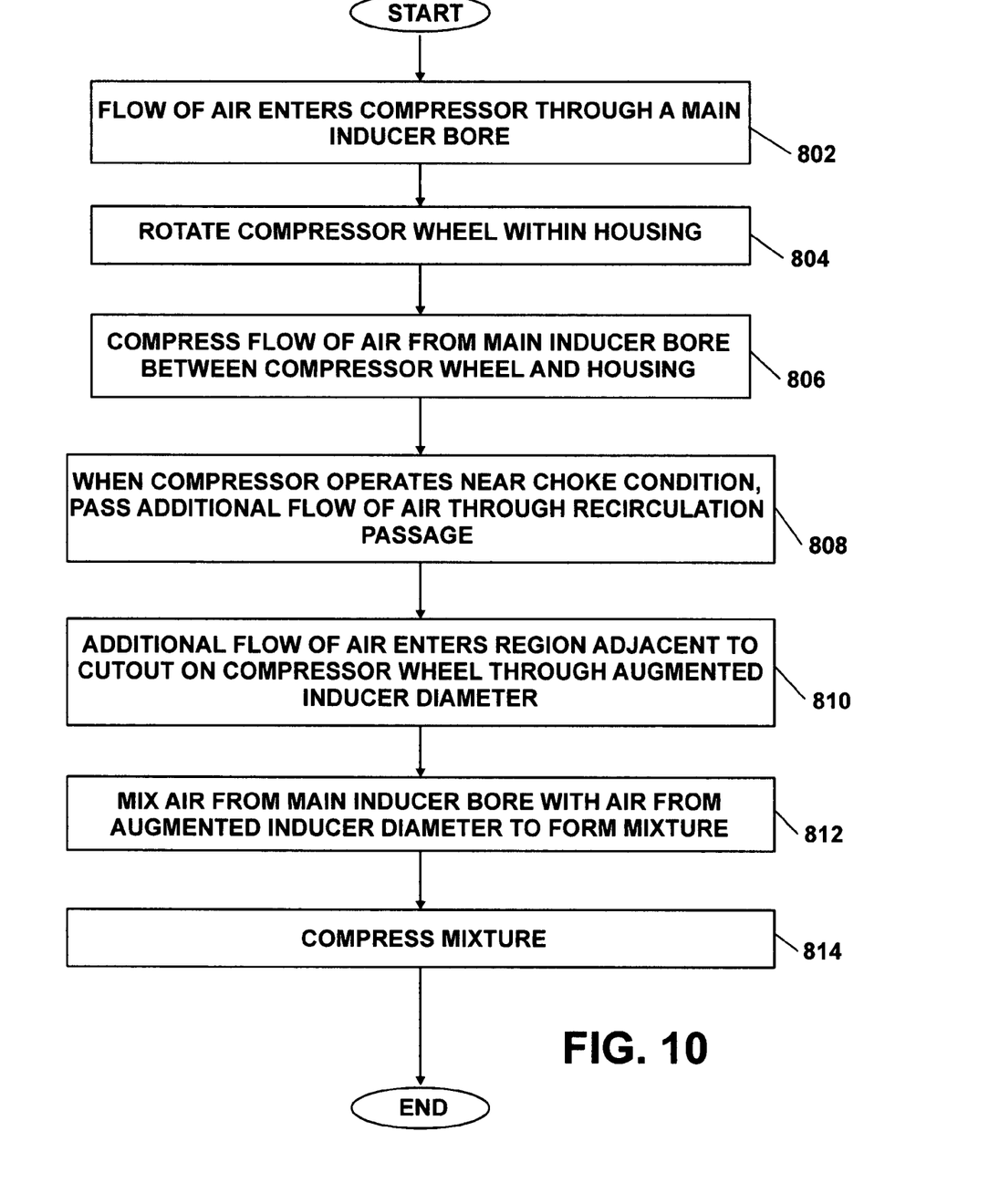
FIG. 10 is a flowchart for a method of improving a performance of a compressor in accordance with the invention.

A flowchart for a method for improving a performance of a compressor is shown in FIG. 10. A flow of air enters a compressor inlet through a main inducer at step 802. A compressor wheel having a plurality of vanes, each vane having an outer edge, is connected to a shaft and rotated within a housing at step 804. The flow of air from the main inducer is compressed between the compressor wheel and the housing at step 806. When the compressor operates near a choke condition, an additional flow of air passes through a recirculation passage at step 808, and enters a region adjacent to a stepped portion of the compressor wheel through an augmented inducer diameter at step 810. The additional flow of air mixes with the flow of air that has entered through the main inducer bore at step 812 to yield a mixture. The mixture is compressed and exits the compressor at step 814. Additional steps for the method described above may include splitting the portion of air into first and second secondary inlet passages, and allowing air to enter the enlarged inducer diameters of the compressor wheel respectively through the augmented inducer diameter and an additional augmented inducer diameter.

Figure 11:
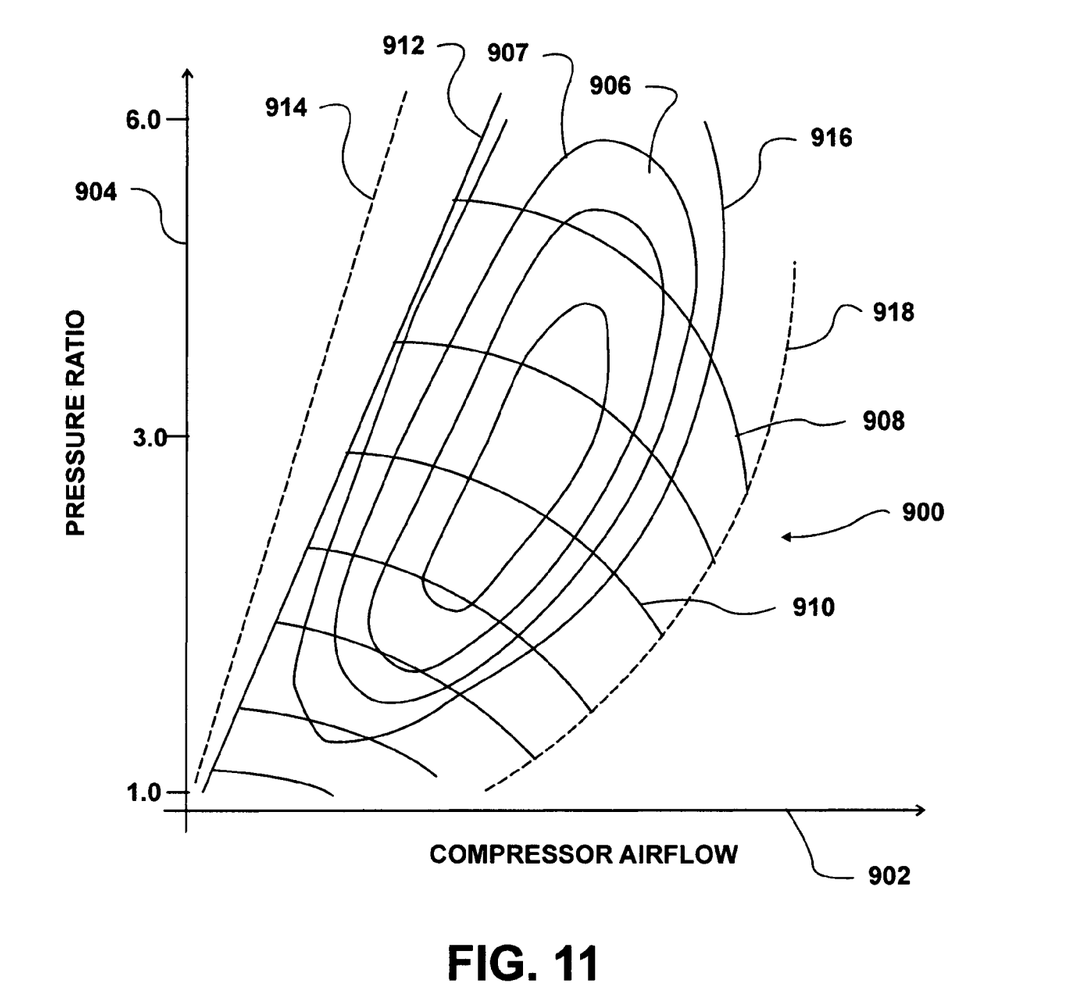
FIG. 11 is a representative graph of a compressor map for a compressor constructed in accordance with the invention.

A representative compressor map 900 for a compressor having a recirculation passage is shown in FIG. 11. The compressor map 900 may be plotted against a horizontal axis 902 representing air flow into the compressor. Typical airflows may be expressed as a function of volumetric flow of air, at a given temperature and pressure, or alternatively as a mass flow rate, again at a given temperature or pressure. Typical values of air flows for compressors depend on the size of the compressor, as is known in the art. A pressure ratio is plotted on a vertical axis 904. The pressure ratio represents the ratio of the air pressure at the outlet of the compressor to the air pressure at the inlet of the compressor. Typical values of pressure ratios for compressors depend on the size and configuration of each compressor, and representative values may range between a ratio of 1.0 to 6.0, although higher pressure ratios are also known.

For any combination of airflow into the compressor and a desired pressure ratio, the compressor map 900 can provide information on efficiency of the compressor along with information on approximate rotational speed of the compressor wheel. Compressor efficiency is most advantageously presented on the map 900 by a plurality of areas, or islands 906. Compressor efficiency may depend on each compressor. For example, in the map 900 the island 906 shown shaded may represent a compressor efficiency of 0.60. Each island may be bound by an iso-efficiency line 907. Each line 907 represents a boundary between areas in the map 900 having different efficiencies. A plurality of curves 908 may represent curves of constant rotational speed of the compressor wheel. The curve 908 that is called out on the graph 900 may, for example, represent a rotational speed of about 280,000 revolutions per minute and represent a maximum allowable speed of rotation. Other curves, for example, the curve 910, representing a rotational speed of 180,000 revolutions per minute, may represent lower rotational speeds ranging from 0 to the maximum allowable speed.

A typical compressor may have a surge line 912 that defines a lower limit of acceptable air flows the compressor can tolerate and operate with even a minimum efficiency. Operation of a typical compressor at or below the surge line 912 is impractical. In one embodiment of this invention, a new surge line 914, shown as a dotted line, may be accomplished because a compressor in accordance with the invention is better able to handle lower air flows, as described above, thus extending its operating range by lowering the typical surge line 912 to the new surge line 914.

Similarly, each compressor has a choke line 916 representing a low efficiency area under conditions of high air flow into the compressor. The recirculation passage(s) in accordance with the invention allow the compressor to ingest a higher amount of air close to a choke condition by, in part, providing an additional volume to augment the inducer bore diameter volume of the compressor. A larger effective volume of the compressor allows more air to enter the compressor thus increasing the compressor's air flow capability. Moreover, the stepped portion(s) on the compressor wheel are capable of accepting additional air entering the compressor through the recirculation passages. As a result, the choke line 916 that determines an upper bound to the compressor map may be moved to a higher air flow capacity. A new choke line 918, shown in a dotted line, may represent the choke conditions of a compressor in accordance with the invention. The new choke line 918 will be at an overall higher air flow for a given pressure ratio compared to a compressor without the invention.

Use of a compressor having at least one secondary inlet is advantageous because it allows for an additional inlet flow of fluid into the compressor wheel. In alternate embodiments the chamber that communicates with the secondary inducer inlet slot may not have an inlet in communication with the main inlet bore, but rather, may have an inlet side that is sealed from the main inlet bore and in communication with another source of fluid, for example, exhaust gas from the exhaust system, crankcase ventilation gases, and so forth.

The embodiments described herein are advantageous because they enable use of a compressor, especially one for an internal combustion engine, to operate below a surge condition and above a choke condition over a wider range of operating conditions when compared to the performance of a typical compressor. The combination of an aerodynamic recirculation passage and entry slot allow for augmented entry of air into the compressor wheel thus increasing the operating range before a choke condition occurs for a compressor with a given inducer diameter. Moreover, the expanding and aerodynamic cross-sectional flow area of the recirculation passage allows for improved entry of air into an augmented or secondary inducer diameter, and may even be arranged to create a Coanda effect in the incoming air to promote lower pressure loss and higher compressor efficiency.

Conditions at the leading edge of compressor wheel vanes near a surge condition are usually supersonic, meaning that the air being recirculated is at a condition of compressible flow. By allowing the compressible flow of the recirculation air to expand, the recirculated air accelerates and pulls more air into the recirculation passage when the compressor operates near a surge condition. In the prior art, the recirculated air is pushed into the recirculation passage by the centrifugal force of the rotating compressor wheel. In the embodiments described herein, the recirculated air advantageously expands and accelerates over an aerodynamic or airfoil-shaped profile, thus creating a low pressure region near an outlet slot that pulls additional air into the passage at the inlet slot and improving the efficiency of the compressor.

Figure 12:
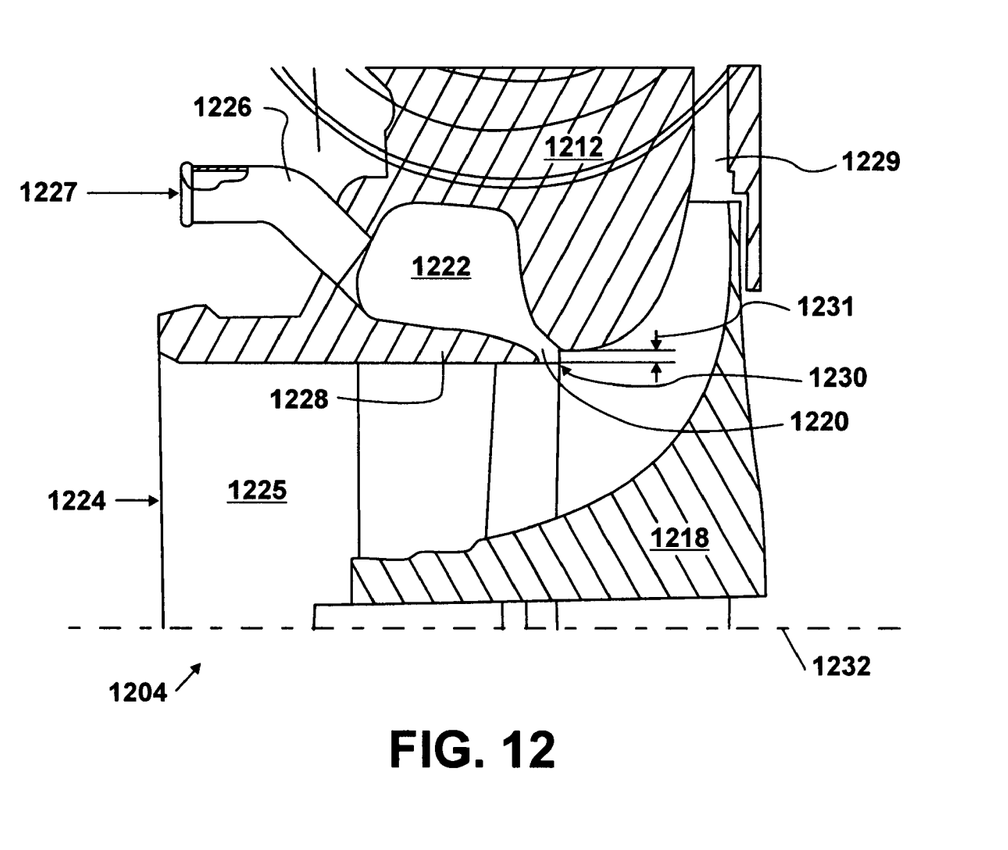
FIG. 12 is a cross-section view of an inlet region of a compressor showing an annular cavity with an external source and an entry slot disposed around the inducer diameter in accordance with the invention.

An alternate embodiment of a compressor 1204 is shown in cross section in FIG. 12. The compressor 1204 has a housing 1212 enclosing a compressor wheel 1218. The housing 1212 in the area of the wheel 1218 has features that allow additional inlet paths to be connected to the compressor 1204. A first inlet slot 1220 fluidly connects a first annular cavity 1222 and functions as an enlargement or augmentation of a main inlet or inducer bore 1225 when the compressor 1204 is in operation at almost any condition, by allowing an additional mass flow of a fluid to access a compressor wheel 1218. An inlet port 1226 fluidly connects the cavity 1222 with other sources of fluid on an engine as will be discussed further. The inlet port 1226 is shown as a tube having a bead formed thereon for connection to a hose (not shown), but any other connection configuration to a passage carrying the fluid that will occupy a portion of the cavity 1222 during operation of the compressor 1204 may be suitable.

The cavity 1222 may advantageously extend substantially around an entire periphery of the main bore 1225 so as not to introduce instabilities in the rotation of the wheel 1218 due to asymmetrical entry of fluid from the cavity 1222 into the wheel 1218. Some applications, however, may be suitable for a cavity extending partially around the main bore 1225 if, for example, a flow of fluid from the cavity 1222 is low, or less than 15% of a rate of flow of air through the main bore 1225, during operation of the compressor 1204.

The cavity 1222 is separated from a main air intake 1224 passage by an inlet wall 1228. The cavity 1222 is the annular volume between the housing 1212 and the inlet wall 1228. The inlet wall 1228 advantageously has a smooth shape within the cavity 1222 to reduce frictional losses and allow for smooth entry of the fluid in the cavity 1222 into the slot 1220. During operation of the compressor 1204, the compressor wheel 1218 rotates about a central axis of a shaft 1232 within the housing 1212. Air enters the compressor assembly 1204 through the air intake 1224 and enters the inducer bore 1225. A fluid enters the compressor housing 1212 through a second inlet 1227. The fluid entering the second inlet 1227 passes into the cavity 1222 through the inlet port 1226. From the cavity 1222, the fluid passes through the slot 1220 into the compressor wheel 1218 where in may mix with air from the inlet bore 1225. The mixture of air and the fluid is compressed and routed to an outlet passage 1229 that may also be formed in the housing 1212.

The wheel 1218 may have a stepped portion 1230 as described above, defining a segmented vane leading edge region 1231 on the wheel 1218 that is adjacent to the slot 1220. The segmented leading edge region 1231 may be oriented according to the orientation of vanes connected to the wheel 1218 as described above. The orientation of the region 1231 shown in FIG. 12 is substantially perpendicular, or, each of the leading edge segments defining the region 1231 may lie on a planar, or in some instances a conical, surface that may form an acute angle with a centerline 1232 of the bore 1225. In this configuration, the vanes connected to the wheel 1218 are pulling fluid into the compressor wheel in a direction that is substantially parallel to the centerline 1232 of the bore 1225, or, a direction of air entering the wheel 1218 through the bore 1225.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A compressor assembly, comprising:
   a compressor housing having a main air inlet, an annular wall defining an inducer bore, a secondary air inlet passage, wherein the secondary air inlet passage is in fluid communication with the main air inlet upstream of the inducer bore;

the secondary air inlet passage being disposed around the inducer bore between an inner periphery of the compressor housing and the annular wall, the secondary air inlet passage having an outlet slot operatively intersecting the inducer bore at the compressor wheel to permit the entry of air thereinto, and an inlet slot in fluid communication with the secondary air inlet passage to permit the entry of air thereinto, the outlet slot defining an augmented inducer diameter region;

and a compressor wheel disposed in the compressor housing, the compressor wheel having a first inducer periphery disposed within the inducer bore, the compressor wheel further having a stepped portion formed by at least one plurality of vanes and providing a larger inducer periphery than the inducer periphery within the inducer bore, the stepped portion being disposed in the augmented inducer diameter region of the housing adjacent to the outlet slot.

2. The compressor assembly of claim 1, further comprising an additional secondary air inlet passage fluidly connected to the main bore with an additional inlet slot and an additional outlet slot; and a collection chamber in fluid communication with both secondary air inlet passages; wherein an additional augmented inducer diameter is formed by the additional outlet slot.

3. The compressor assembly of claim 2, further comprising an additional stepped portion formed in the compressor wheel, wherein the additional stepped portion is adjacent to the additional outlet slot and disposed in the additional augmented inducer diameter.

4. The compressor assembly of claim 1, further comprising a wall disposed between the secondary air inlet passage and the main inlet bore, wherein the wall has an aerodynamic cross-section.

5. The compressor assembly of claim 1, wherein the secondary air inlet passage has a decreasing cross-sectional flow area, and wherein the cross-sectional flow area decreases in a direction from the inlet slot toward the outlet slot.

6. The compressor assembly of claim 1, further comprising a ring disposed adjacent to the inlet slot.

7. The compressor assembly of claim 1, wherein the stepped portion is a notch formed near a leading edge of each of the at least one plurality of vanes.

8. The compressor assembly of claim 1, further comprising a second plurality of vanes disposed on the compressor wheel, wherein the stepped portion is a difference of an outer diameter and a length between the first plurality of vanes and the second plurality of vanes.

9. A method of improving a performance of a compressor, comprising the steps of:
connecting a compressor wheel having a plurality of vanes, each vane having an outer edge, to a shaft;
rotating the compressor wheel within a housing;
compressing a flow of air entering through an inducer bore between the compressor wheel and the housing;
admitting an additional portion of a flow of air through a secondary inlet passage when the compressor is close to a choke condition;
pulling the additional portion of air flow into an augmented inducer bore diameter with at least one stepped portion in the compressor wheel;
mixing the additional portion of air with the flow of air entering through the main inlet bore.

10. The method of claim 9, further comprising the step of splitting the additional portion of air flow into a first secondary inlet passage and a second secondary inlet passage.

11. The method of claim 10, further comprising the step of recombining the additional portion of air flow from the first secondary inlet passage and the second secondary inlet passage.

12. The method of claim 10, wherein the step of pulling the portion of the air flow into the secondary inlet passage is accomplished by ingesting air into a region of the compressor wheel that is adjacent to the at least one stepped portion.

13. The method of claim 10, further comprising the step of pulling the portion of the air flow into the secondary inlet passage is accomplished by ingesting air through an additional augmented inducer bore diameter, into a region of the compressor wheel that is adjacent to a second stepped portion.

14. The method of claim 9, wherein an operating range of the compressor is increased by increasing a choke point condition.

15. A method of improving a performance of a compressor, comprising the steps of:
connecting a compressor wheel having a plurality of vanes that form a stepped portion;
rotating the compressor wheel within a housing;
compressing a flow of air from a main inducer between the compressor wheel and the housing;
admitting a portion of the flow of air in the turbulence field into a passage through a first opening when the compressor is close to a choke condition;
pulling the portion of the air flow into the passage with an aerodynamically shaped wall;
passing the portion of the air flow through a second opening into at least one additional inducer region, wherein each additional inducer region is disposed around the main inducer.

16. The method of claim 15, further comprising the step of splitting the portion of the air flow into a first passage connected to a first additional inducer and a second passage connected to a second additional inducer.

17. The method of claim 16, further comprising the step of recombining the portion of the air flow from the first passage and the second passage in the compressor wheel.

18. The method of claim 15, wherein the step of pulling the portion of the air flow into the passage is accomplished by creating a low pressure region near the at least one additional inducer region.

19. The method of claim 15, further comprising the step of providing structural support to an inner wall with a plurality of ribs disposed in the passage, wherein a spacing between each of the ribs is varied.

20. The method of claim 15, wherein each additional inducer region coincides with a corresponding stepped portion of the compressor wheel.

21. A compressor comprising: a housing having a main air inlet passage that includes an inducer bore disposed to receive in close proximity thereto an inducer portion of a compressor wheel, and a compression scroll portion disposed to receive in close proximity thereto a compression portion of the compressor wheel, the housing further having a secondary inlet passage; the secondary inlet passage including an inlet slot that is connected through a chamber in said housing to an outlet slot; the outlet slot forming an augmented inducer diameter in the housing that is larger than the diameter of the inducer bore and disposed between the inducer bore and the compression scroll portion; and wherein the compression portion of the compressor wheel comprises a plurality of vanes each comprising an outer edge that extends from a leading edge to a trailing edge and that contains a stepped edge portion that radially overlaps and faces the augmented inducer diameter formed by the outlet slot.

22. The compressor of claim 21, wherein the housing further comprises an air supply opening, wherein the secondary inlet slot and the inducer bore are operatively connected to the air supply opening such that a first portion of a flow of air in the air supply opening enters the main air inlet passage, and wherein a second portion of the flow of air in the air supply opening may enter the secondary inlet passage.

23. The compressor of claim 21, wherein the chamber is fluidly isolated from the main air inlet passage.

24. The compressor of claim 21, further comprising an additional secondary inlet passage with an additional inlet slot connected through the chamber to an additional outlet slot; wherein an additional augmented inducer diameter is formed by the additional outlet slot.

25. The compressor of claim 24 wherein each of the vanes comprises an additional stepped edge portion that radially overlaps and faces the additional augmented inducer diameter formed by the additional outlet slot.

26. The compressor of claim 21, further comprising a wall disposed between the secondary inlet passage and the inducer bore, wherein the wall has an aerodynamic cross-section.

27. The compressor of claim 21, wherein the secondary inlet passage has a decreasing cross-sectional flow area, and wherein the cross-sectional flow area decreases in a direction from the inlet slot toward the outlet slot.

28. A compressor comprising:
 a housing having a main air inlet passage that includes an inducer bore disposed to receive in close proximity thereto an inducer portion of a compressor wheel;
 a compression scroll portion disposed to receive in close proximity thereto a compression portion of the compressor wheel;
 the housing further comprising two secondary air passages shunting the inducer bore at successively larger radial distances from the inducer bore;
 a radially inner one of the secondary air passages being separated from the inducer bore by a radially inner wall of the housing and from a radially outer one of the secondary air passages by a radially outer wall of the housing;
 the secondary air passages comprising respective inlet slots that are open to an entrance of the main air inlet passage and respective outlet slots that form respective augmented inducer diameters in the housing and that are open to vanes of the compressor wheel at respective augmented inducer diameters disposed between the inducer bore and the compression scroll portion;
 the augmented inducer diameter of the outlet slot of the radially outer secondary air passage being greater than that of the outlet slot of the radially inner secondary air passage and being disposed between the outlet slot of the radially inner secondary air passage and the compression scroll portion.

29. The compressor of claim 28 wherein the compression portion of the compressor wheel comprises a plurality of vanes each comprising an outer edge that extends from a leading edge to a trailing edge and that contains a stepped edge portion that radially overlaps and faces the augmented inducer diameter formed by one of the outlet slots.

30. The compressor of claim 28 wherein the compression portion of the compressor wheel comprises a plurality of vanes each comprising an outer edge that extends from a leading edge to a trailing edge and that contains respective stepped edge portions that respectively radially overlap and face the augmented inducer diameters formed by the respective outlet slots.

* * * * *